United States Patent [19]

Ying et al.

[11] 4,178,777
[45] Dec. 18, 1979

[54] SLIDING SUPPORT FOR A SUPERCONDUCTING GENERATOR ROTOR

[75] Inventors: Sui-chun Ying, Monroeville; Glen D. Cooper, North Huntington Township, Westmoreland County, both of Pa.

[73] Assignee: Electric Power Research Institute, Palo Alto, Calif.

[21] Appl. No.: 848,849

[22] Filed: Nov. 7, 1977

Related U.S. Application Data

[62] Division of Ser. No. 732,561, Oct. 15, 1976.

[51] Int. Cl.² .............................................. F16D 3/78
[52] U.S. Cl. ............................................ 64/13; 403/359;
403/290; 403/287
[58] Field of Search ............. 403/359, 290, 336, 335, 403/287, 28; 285/DIG. 5, 187; 62/505, 499; 64/13

[56] References Cited

U.S. PATENT DOCUMENTS

| 2,558,266 | 6/1951 | Neighbour et al. | 403/290 |
| 3,836,272 | 9/1974 | Duer | 403/399 |
| 3,924,978 | 12/1975 | Loyd, Jr. et al. | 403/290 |
| 3,942,053 | 3/1976 | Abolins et al. | 310/52 |
| 4,017,755 | 4/1977 | Litz | 310/40 R |

*Primary Examiner*—Andrew V. Kundrat
*Attorney, Agent, or Firm*—Townsend and Townsend

[57] ABSTRACT

The sliding support connection of the inner rotor to the rotating outer rotor and stub shaft of the generator power train is closed by a flexible diaphragm which has protruding axially therefrom a plurality of integrally attached fingers. These fingers, at an outside radial surface, bear into a complementary cylindrical cavity in the end of the stub shaft having female spline receiving concavities. The fingers on their inside dimension define a frustoconical surface which bears against a spring loaded frustoconical mandrel, preferably loaded by a Belleville spring. During thermal axial excursion incident to cool down, the fingers by sliding into and out of the spline concavities in the stub shaft accommodate relative axial movement of the inner rotor relative to the outer rotor. During on-line operation of the rotor, the fingers maintain a positive and nonsliding fit with the stub shaft so that by positive outward pressure at the fingers, slip and fretting corrosion of the fingers and stub shaft is prevented. All necessary rotational flexure of the inner rotor is taken by the flexible diaphragm closing the inner rotor.

4 Claims, 4 Drawing Figures

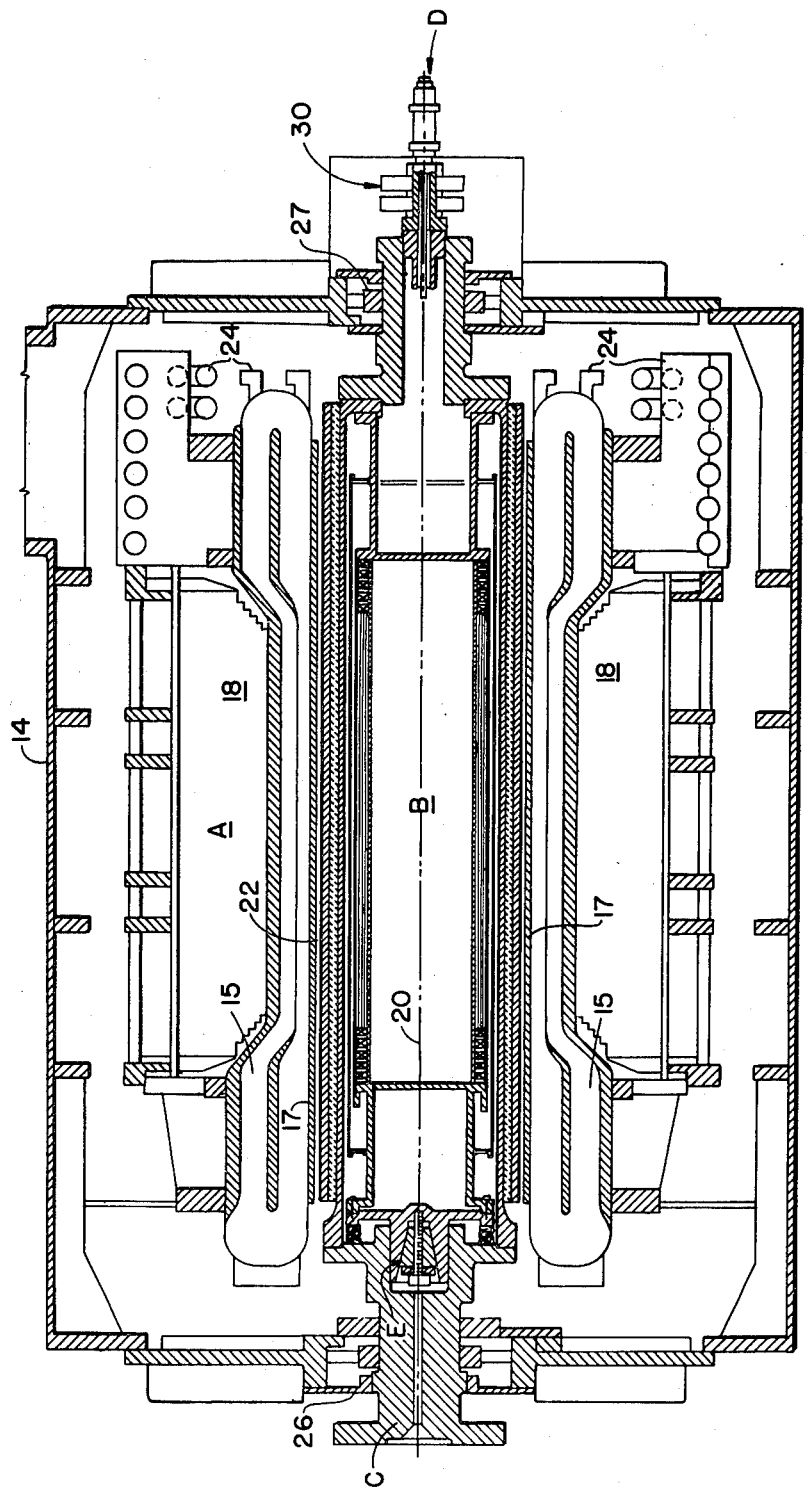
FIG._1.

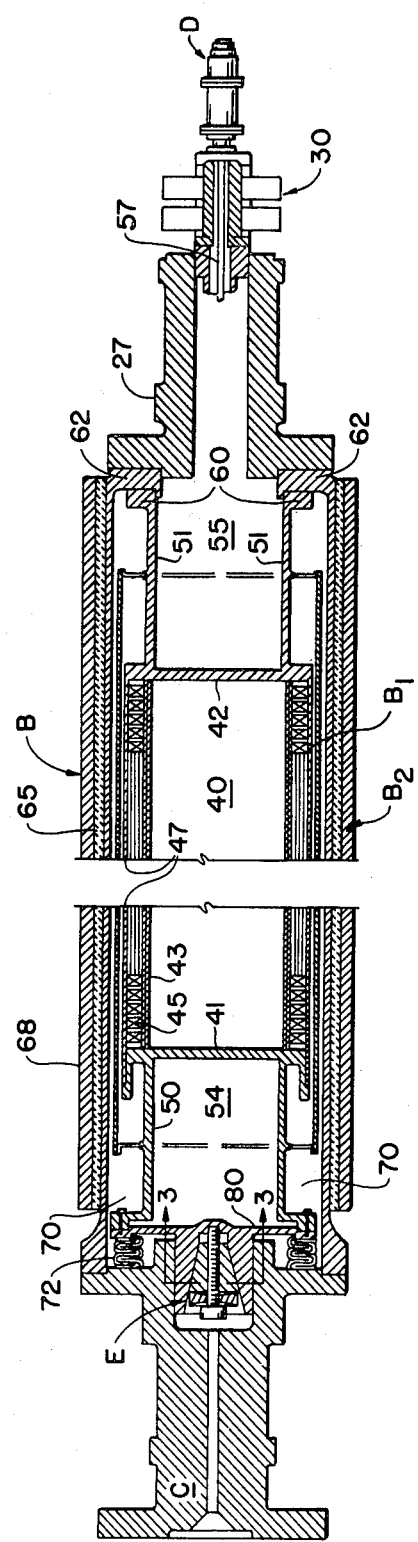
FIG._2.

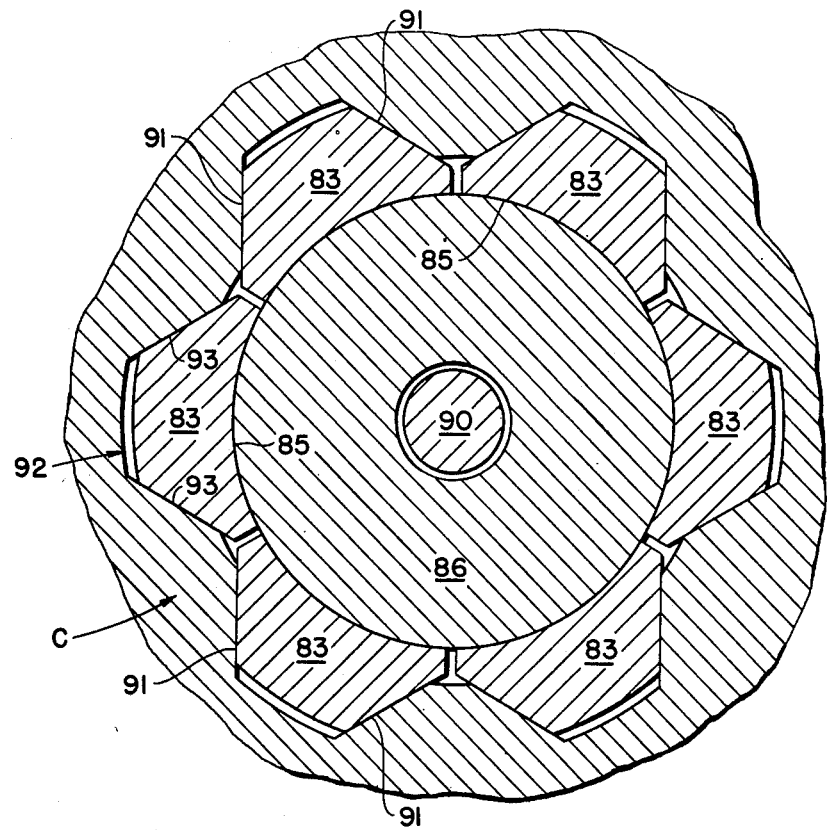
FIG._3.
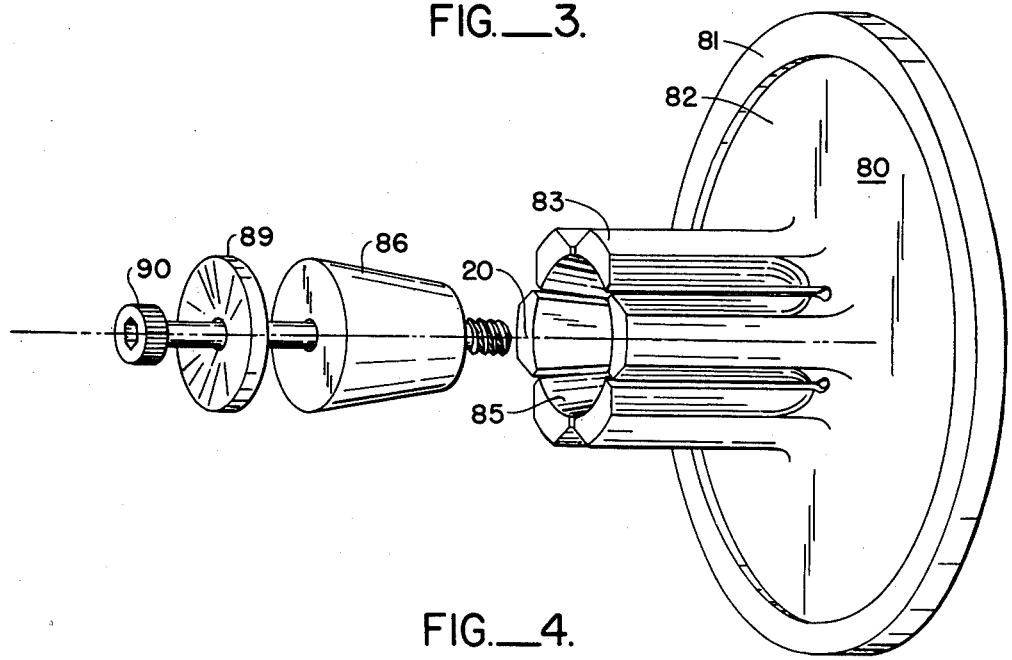
FIG._4.

SLIDING SUPPORT FOR A SUPERCONDUCTING GENERATOR ROTOR

This is a division of application Ser. No. 732,561, filed Oct. 15, 1976.

This invention relates to a superconducting generator rotor. More particularly, the invention relates to a connection between a rotating stub shaft of a generator power train and the rotating inner and outer rotor structures of a supercooled rotor assembly having superconducting windings.

STATEMENT OF THE PROBLEM

Superconducting rotors placed within generators are desirable. Overall, they represent an elimination of losses in the windings of a rotor with an increase in generator efficiency of as much as 1%. Additionally, they allow generator rotors and hence generator stators to be built to a much smaller dimension. This includes a reduction in weight of the overall generator. Moreover, when the rotor is constructed to a smaller diameter, there is a resultant reduction of the problems encountered in high speed rotating rotors.

Superconducting rotors consist of two separate parts. Outermost there is a damper shield and damper shield support. Innermost there is an inner rotor structure including the superconducting windings or coils immersed within a helium refrigerated annulus. This helium refrigerated annulus typically maintains the temperature of the superconducting coils at 4.3° Kelvin or below so that superconductivity takes place.

The outer damper shield and damper shield support serve two functions. First, they comprise the outer thermal jacket of the supercooled rotor. Second, the function of the shield is to prevent back electromotive forces from the stator penetrating to the superconducting coils. If penetration to the superconducting coils of the back electromotive forces occurs, the coils of the windings become heated. When they are heated above 4.3° Kelvin, they become non-superconducting and the designed rotor field is lost.

A critical design parameter of the damper shield and damper shield support is to accommodate short circuit loading of the generator stator. In such short circuit loading, the stator experiences very large current flows with corresponding very large back electromotive forces being placed on the shield of the stator. This force tends to squash the outer rotor structure from its normal circular cross-section to an elliptical cross section, while the rotor is turning at high speed. The shield must be highly conductive to oppose the A.C. stator flux. At the same time, the damper shield support must be very strong to resist the mechanical impact of the electromotive forces.

During normal operation, the inner rotor structure is first subjected to "cool down". In cool down, liquified helium is introduced into the vicinity of the superconducting coils. The inner rotor undergoes substantial thermal contraction and resultant excursion in the axial direction. Taking the case of a rotor 132 inches long, thermal contraction of 3/10 inch can be anticipated. In a longer rotor on the order of 275 inches long, thermal contraction of as much as 7/10 inch can be anticipated.

At the same time this axial shrink is accommodated, two adverse effects on the rotor must be eliminated. First, any tendency of the inner rotor structure to move torsionally with respect to the outer rotor structure during operation must be resisted. Otherwise, this relative movement between inner and outer rotor structure will generate undesired back electromotive forces from the damper shield to the rotor. These back electromotive forces will heat the superconducting coils and result in loss of their superconducting capability with correspondent loss of the designed rotor field.

Secondly, the power train to the inner rotor must accommodate a sliding fit. This sliding fit must not minutely move during normal rotor rotation. If a minute movement of the sliding fit occurs with each rotation of a piece of machinery rotating at 3600 rpm, a rapid "fretting corrosion" of the sliding parts of the joint will occur. Specifically, the joint will disintegrate with a growing red oxide which eats and destroys the power transmitting joint along the sliding interface of the power transmitting joint.

SUMMARY OF THE PRIOR ART

Heretofore at least one rotor end has been equipped with either flexible diaphragms or spokes. These diaphragms or spokes, while providing a satisfactory connection for prototype rotors having relatively short axial lengths, are not workable for rotors having long lengths. This is because the diaphragm and spoke connections, when subjected to the relative thermal excursions of the inner and outer rotors have combined bending stresses, rotational stresses and torsional stresses (especially those found in the critical stator short circuit parameter) exceeding the limits of available strength of materials.

SUMMARY OF THE INVENTION

In a superconducting generator rotor, the rotor includes a cylindrical outer rotor structure for resisting mechanical and electrical forces from fields in the stator and a coaxial supercooled inner rotor winding structure to provide high field intensity with no resultant current flow losses in the superconducting windings. These inner and outer rotor structures are rigidly connected against torsional and axial relative movement at one end of the rotor. At the opposite end of the rotor the sliding support connection of this invention is required. This sliding support permits relative axial movement of the inner rotor relative to the outer rotor during cool down. At the same time the sliding support resists slip and fretting corrosion during normal operating conditions all without relative torsional movement between the inner and outer rotor assemblies. The sliding support connection of the inner rotor to the rotating outer rotor and stub shaft of the generator power train is closed by a flexible diaphragm which has protruding axially therefrom a plurality of integrally attached fingers. These fingers, at an outside radial surface, bear into a complementary cylindrical cavity in the end of the stub shaft having female spline receiving concavities. The fingers on their inside dimension define a frustoconical surface which bears against a spring loaded frustoconical mandrel, preferably loaded by a Belleville spring. During thermal axial excursion incident to cool down, the fingers by sliding into and out of the spline concavities in the stub shaft accommodate relative axial movement of the inner rotor relative to the outer rotor. During on-line operation of the rotor, the fingers maintain a positive and non-sliding fit with the stub shaft so that by positive outward pressure at the fingers, slip and fretting corrosion of the fingers and stub shaft is prevented.

All necessary rotational flexure of the inner rotor is taken by the flexible diaphragm closing the inner rotor.

OTHER OBJECTS AND ADVANTAGES OF THE INVENTION

An object of this invention is to provide a torsionally stiff and yet sliding inner and outer rotor connection to the drive train of a generator. Accordingly, the drive train is rigidly connected to the outer rotor structure and provided with a cylindrical, axially symmetrical concavity exposed to the inner rotor. This concavity has a series of axially extending female spline receiving concavities. Biased male splines from the inner rotor structure fit into the female spline concavity of the stub shaft to effect powered rotation of the inner rotor structure.

An advantage of the sliding finger torsional coupling of the inner rotor relative to the outer rotor is that during cool down it provides for thermal excursion of the inner rotor relative to the outer rotor.

A further advantage of this sliding finger design is that torsional movement of the inner rotor relative to the outer rotor during on-line operation of the supercooled rotor is prevented. Accordingly, back electromotive force heating of the superconducting coil windings from the damper shield to the windings is prevented.

A further object of this invention is to load the torque-transmitting fingers to the inner rotor with a predetermined loading into the female spline concavities of the stub shaft. The fingers together define a frustoconical contour. A frustoconical mandrel is spring-loaded, preferably by means of a Belleville spring against the fingers at their inner mutual frustoconical contour. A constant loading of the fingers into female spline concavities of the stub shaft is provided on the order of 1000 to 2000 psi.

An advantage of the mandrel loading of the fingers is that the fingers bear against their respective concavities with such force that minute movement of even an elongate rotor during operational rotation is prevented. Problems of fretting corrosion resistance are overcome.

An additional advantage of the biased fingers is that they provide to the supported rotor end a rotating yet rigidly normal connection. This normal connection provides a cantilevered type support to the rotor end during rapid rotation, even though the inner rotor has axial excursion.

Yet another object of this invention is to provide to the finger ends an integral connection to a flexible diaphragm. The flexible diaphragm forms a supporting and driving connection to the inner rotor. Accordingly, the fingers are all integrally connected to a diaphragm which closes the end of the inner rotor.

An advantage of the flexible diaphragm closure is that flexure of the diaphragm can take up what would otherwise be a force causing minute finger movement at the sliding finger connectors of this invention. Assuming that under the forces of gravity an elongate rotor inevitably has some sag, forces tending to move the fingers can all be taken up by flexure at the diaphragm.

A further advantage of the diaphragm in combination with the sliding fingers is that the diaphragm itself is not subjected to the stresses of thermal excursion of the inner rotor. Rather, the diaphragm, when it approaches a loading limit due to thermal excursion, can then transmit the force to the fingers and cause the fingers to move by axial slip in their respective finger concavities.

Other objects, features and advantages will become more apparent after referring to the following specification and attached drawings in which:

FIG. 1 is a side elevation section through a generator stator and rotor with the inner and outer rotor structure being illustrated in heavy lines;

FIG. 2 is an enlarged side elevation section taken along the axis of a superconducting generator rotor illustrating the inner and outer rotor structure;

FIG. 3 is a side elevation axial section taken through line 3—3 of FIG. 2 illustrating the stub shaft, outer rotor, and slideably connected inner rotor;

FIG. 4 is a detail illustrating the contour of the fingers and female finger-receiving concavities in the stub shaft.

DESCRIPTION OF THE PREFERRED EMBODIMENTS

Referring to FIG. 1, a stator A is shown in section with a rotor B disposed axially thereof. Rotor B is driven by a stub shaft C and has at its end opposite the stub shaft a cryogenic transfer system D. Between the rotor B and the stub shaft C the sliding support E for the superconducting generator is placed. It should be understood that this sliding support of this generator is the main point of novelty herein. However, the presence of this sliding support allows superconducting rotor B and its corresponding stator A to be elongate and to use supercooled windings in the elongate rotor, thereby providing an overall generator of relatively narrow width with higher flux density than has heretofore been used with such generators.

Stator A includes a frame 14 extending around its periphery and contains therewithin air gap type windings 15 wound between an interior glass epoxy laminated cylinder 17 and a laminated core 18. As in the case of most stator windings, the windings are placed in generally a toric configuration about the axis 20 of a rotor and define between the exterior of the rotor and the interior of the windings a small air gap 22.

Because of the high flux density within the stator for the generation of electricity, the stator is water-cooled. Such water cooling occurs through manifolds 24, which manifolds will not be discussed in detail.

Rotor B is located axially of the stator along a rotor axis 20. It is driven by a stub shaft C connected to a power train at one end and is held to the stator in paired bearings. A first bearing 26 is adjacent stub shaft C. A second bearing 27 is at the opposite end. This bearing is placed near the relatively rotatable cryogenic transfer system D.

Relatively rotatable cryogenic transfer system D transfers liquid helium to and from the interior of rotor B. This system is fully described in an article entitled "A Relatively Rotatable Cryogenic Transfer System" dated July 19, 1972 in a technical publication available at the Massachusetts Institute of Technology, marked MT-125J. In addition to and adjacent the transfer system D, the generator includes conventional collector rings 30, which rings transfer current to the field windings of the rotor B.

Having set forth in general the construction of the stator A, stub shaft B, and having pointed out the general location of the bearings as well as the stub shaft C and the cryogenic transfer system D, attention can now be devoted in detail to the construction of the rotor, which is illustrated in FIG. 2.

Rotor B includes an inner rotor assembly $B_1$, an outer rotor assembly $B_2$, and a narrow spatial gap therebetween. Adjacent transfer assembly D, the inner and outer rotors are rigidly joined. The sliding support E of this invention is at the opposite end and provides for relative axial movement between the inner rotor $B_1$ and the outer rotor $B_2$.

Inner rotor $B_1$ includes a helium chamber 40 to which transfer assembly D communicates helium in a liquified form. This helium serves to keep the windings of the generator in a superconducting state by maintaining the windings in the range of 4.3° Kelvin or lower. This temperature corresponds to −269° C.

Helium chamber 40 is bounded on either end by end walls 41, 42 and has a cylinder 43 extending between the end walls. Generator windings 45 are wound about cylinder 43 and are the elements which are kept in a supercooled state for the superconducting phenomenon of this invention. Typically, the field windings 45 are of a niobium-titanium alloy cast in a copper nickel matrix. They are a standard item of manufacture of the Airco Company of New Haven, Connecticut. The field windings are bounded on their exterior by a field winding support 47. Thus, the field windings are bounded on their exterior by cylindrical field winding support 47, and on the interior by the cylinder 43.

Connection of the cylinders 43, 47 and the field windings therebetween to the body of the rotor is accomplished by torque tubes 50, 51 at either end. Torque tubes 50, 51 serve to prevent relative rotation of the windings 45 relative to the remainder of the rotor.

Between the helium chamber 40 and the end of the torque tubes there is provided vacuum chambers 54, 55. These vacuum chambers impart a thermos bottle-like enclosure to the helium chamber 40 in a manner not unlike a conventional Dewar. Inner rotor $B_1$ comprises the inner section of the Dewar. Outer rotor $B_2$ comprises the outer section of the Dewar. An air gap between the inner and outer sections maintained essentially under a vacuum completes the Dewar. Helium is communicated to and from the helium chamber 40 in the interior of the Dewar in a conduit 57 which extends from the cryogenic transfer system E to and through wall 42 of the helium chamber.

It should be noted that the rotor in the vicinity of the collector rings 30 and the cryogenic transfer system D is not provided with axial excursion. Therefore, any occurring axial excursion of the rotor must be taken up in the slip joint E.

Torque tube 51 connects at end 60 to one end of an inner damper shield support 62. Outer rotor $B_2$ includes inner damper shield support 62 which is typically an inner support of high strength about which a damper shield 65 is supported. Exterior of damper shield 65 there is an outer damper shield 68.

Inner damper shield 62, damper shield 65, and outer damper shield 68 comprising outer rotor $B_2$ together perform a vital function. Specifically, this shields the rotor from back electromotive forces produced by the stator.

When the inner rotor and shield rotate together, the large field force produced by the rotor is not seen by the shield because the shield rotates with the field. Rather, it easily penetrates through the shield into the stator windings 15 where it produces the desired electrical current.

The back electromotive force from the stator would, in the absence of the damper shield 65, head toward and heat the rotor windings 45. If this back electromotive force were to reach the supercooled windings 45, it would create a heat load. This heat load would take the windings out of the superconducting state and the designed current within the superconducting coils 45 would be immediately lost.

Damper shield 65 is a medial member between the stator and the superconducting windings 45 of the rotor. This damper shield "sees" the back electromotive force produced in the stator and conducts it away from the rotor. Thus, the active windings 45 of the rotor in their superconducting state never "see" the back electromotive force of the rotor by virtue of the shield 65.

Another way to understand how the shield looks to back electromotive force from the stator is to say that it has a mirror effect as to stator eddy currents. This mirror acts to loop and make a back electromotive force which bucks out the electromotive force from the stator trying to penetrate the rotor.

The function of the inner support 62 and the outer support 68 can be understood. One of the critical parameters to which the generator is designed is that of a short current in the stator winding 15. In the event that such a generator is shortcircuited, the stator will run with a tremendously high current for short periods of time. This high current will produce a back electromotive force from the stator to the rotor which, in spite of the presence of the damper shield 65, will tend to crush the rotor. Understanding that the normal shape of the rotor is circular, this back electromotive force will try to turn the circular shape of the rotor into an elliptical shape. Thus, portions of the rotor will squeeze together while other portions will try to move further apart. This will occur during on-line rotation of the rotor at high speed (the rotation here being in the range of 3600 rpm).

Damper shield 65 is designed to take away the current aspect of the back electromotive force. While damper shield 65 functions to do this, it is subjected to tremendous mechanical forces. These mechanical forces are resisted by the inner damper shield support 62 and the outer damper shield support 68. Thus these inner and outer damper shields 62, 68 produce the mechanical support for the damper shield 65. The damper shield provides for non-penetration of these high electromagnetic forces into the supercooled windings 45 of inner rotor $B_1$.

It should be understood that the rotor of this design is relatively narrow in diameter and relatively long for the production of a high field. According to one aspect of this invention, the rotor may be 37 inches in diameter with an overall length of 160 inches. A larger rotor of up to 43 inches in diameter for a total length of 260 inches can also be utilized. It should be understood that with a rotor in the range of 260 inches, an overall contraction in the rotor during cooldown prior to bringing the rotor on line 7/10 inch can occur. For rotors of 160 inches in length, a cooldown can produce rotor concentration of 3/10 inch.

It should be understood that between the assembly containing the windings 45 and the damper shield, there is preferably provided a small gap which is under a vacuum. Thus, the entirety of the rotor B consists of two discrete assemblies. There is an inner rotor structure $B_1$ which includes the helium chamber 40, and the supercooled windings 45. There is also an outer rotor structure $B_2$ which includes the damper shield 65 and its inner support 62 and outer support 68.

Regarding these inner and outer rotor assemblies, it is of paramount importance that there be no relative torsional movement between the windings 45 and the damper shield 65. Small torsional movement of the windings relative to the damper shield can function to generate electromagnetic forces in the windings 45. These electromagnetic forces in the windings 45 can cause heating, resultant loss of the superconductive state, and attendant loss of the design rotor field and loss of the overall design generator load. Torque tubes 50 and 51 serve to prevent such relative rotation and provide an overall and torsionally rigid structure to the entire length of the rotor.

The vacuum interior of vacuum chamber 54 extends exterior of the chamber to an evacuated annulus 70. Annulus 70 is separated from atmosphere by a bellows 72. Bellows 72 are provided to permit axial excursion of the inner rotor relative to the outer rotor while, at the same time, permitting slip joint E of this invention to operate in a gaseous environment, preferably ambient atmosphere. This prevents "welding" of the metal interface of slip joint E which might otherwise occur in a vacuum.

Having set forth the inner and outer rotor structures, a problem which this invention solves can now be discussed. Specifically, when the rotor B is brought on line helium is introduced interior of chamber 40. This causes windings 45 to be cooled into the range of 4.3° Kelvin and causes the windings 45 to go into a superconducting state.

Unfortunately this same cooling causes the rotor to undergo axial excursion. Since such axial excursion is not taken up in the vicinity of either the collector rings 30 or the cryogenic transfer system D, it must be taken up at the stub shaft end of the rotor assembly C. Specifically, the inner rotor assembly including superconducting coils 45 will contract relative to the outer rotor assembly including the damper shield 65 and its inner support 62 and outer support 68. The problem which the invention solves is how, as a practical matter, this axial excursion can be taken.

Vacuum chamber 54 is closed at one end by a diaphragm 80. Diaphragm 80 is provided with an annulus 81, a flexible medial portion 82, and six radially extending tines 83. Preferably, tines 83 are integral to the flexible portion of the diaphragm 82 and protrude normally therefrom all about the axis 20 of the generator rotor and stator.

Tines 83 together form therewith a frustroconical cavity 85. Frustroconical cavity 85 has an interior female shape which is complementary to an exterior frustroconical mandrel 86. Mandrel 86 includes at its outermost end and bears against a Belleville spring 89. This Belleville spring 89 biases the frustroconical mandrel 86 against the frustroconical aperture 85 to exert a uniform outward force on the tines 83. Belleville spring 89 is held securely against mandrel 86 by an axial bolt 90. The bolt 90 biases the mandrel with considerable force. This force provides a bias at tines 83 in the range of 1000 to 2000 pounds per square inch along their finger surfaces.

Fingers 83 are generally provided with bevels 91. These bevels form the male surfaces of the tine 91. The stub shaft C is provided with interior and mating female tined cavities 92. Tined cavities 92 include female bevels 93. Female bevels 93 are the surfaces against which the individual tines 83 bear during rotation of the inner and outer rotor members.

It will be remembered that stub shaft C is rigidly connected to the outer rotor assembly including damper shield 65 and inner shield support 62 and outer support 68. Likewise, the diaphragm 80 is rigidly connected to the inner rotor including the supercooled windings 45 and the helium chamber 40 and the vacuum chambers 54, 55.

Having set forth the construction of the mechanism, its operation can be easily understood. It is noted that fingers 83 are cantilevered into the diaphragm. The pressure exerted on these fingers from the conical mandrel 86 biases the fingers 83 outwardly into rigid contact with the female concavity and stub shaft C. Specifically, fingers 83 at surfaces 91 bear with great force on female cavities 92 at complementary bevelled surfaces 93. When the rotor B is initially brought to the supercooled state, contraction will occur. Specifically, fingers 83 will slide within stub shaft C so that the fingers are partially withdrawn from the interior of the stub shaft. When cooling has ceased, withdrawal of the fingers 83 will likewise cease.

It will be appreciated that the rotor is relatively long (in the range of 160 to 260 inches). Specifically, from its support at bearings 26 at one end, to bearings 27 at the opposite end, rotor B will tend to sag. This sagging will be a natural flexure under the weight of the rotor including its metallic parts, liquified helium, and supercooled windings. This weight produces from one end of the rotor to the other end of the rotor a small degree of warp. This warp would cause relative deflection inwardly and outwardly of the fingers. Since the rotor turns at a speed in the range of 3600 revolutions per minute, a small finger motion would be produced with each revolution. This small finger movement with each revolution would cause a phenomenon known as "fretting corrosion."

In the fretting corrosion phenomenon, the fingers would undergo a minute amount of axial slide motion with each revolution. Fingers 83 would slowly grind the interface between their bevelled edges 91 and the female bevelled edges 93 into a red dust. This red dust would be a combination of oxidation and metal fatigue. The whole joint between the inner and outer rotor at the drive shaft would collapse.

This fretting corrosion is resisted by two discrete forces. First, the fingers are provided with a bias outwardly by the mandrel 86. This bias is sufficient to overcome all tendency of the fingers to move axially during rotation.

Secondly, diaphragm 80 at flexible portion 82 is provided with flexure. Necessary deflection of the rotor occurs all at the diaphragm 82. None of the flexure is produced at the fingers 83. The result is that during rapid relative rotation fretting corrosion is avoided.

It should be understood that the invention described herein will admit of modification. For example, it is possible to reverse the fingers so that they are biased inwardly rather than biased outwardly. It should be noted that in this configuration, centrifugal force would oppose the biased fingers. Secondly, it is not necessary to have a Belleville spring. Various combinations of leaf springs and other members could be utilized. Moreover, the joint could be reversed. The fingers could be disposed towards the rotor rather than away from the rotor.

It should be noted that the fingers are in an atmospheric or gaseous ambient. This atmospheric or gaseous ambient prevents the metal of the fingers from being welded together.

It should be apparent that this invention will admit of modification, all without departing from the spirit of this invention.

I claim:

1. A high speed rotating coupling including a flexible diaphragm member attached to a first end of said coupling; a plurality of axially disposed fingers defining outer contacting surfaces parallel to said axis intergrally attached to said flexible diaphragm, said fingers providing a rigid torsional connection to said diaphragm and extending axially of said rotating structures from the first end of said coupling toward the second end of said coupling; a member defining a corresponding plurality of spline receiving, axially extending slots for receiving fingers of said diaphragm attached to the second end of said coupling; means biasing said fingers relative to said axis with a force into said slots; said biased fingers received within said finger receiving slots to slide with excursion of one of said rotating structures with respect to the other of said rotating structures and to remain in non-slipping contact across said coupling during rotation of said rotating structures together whereby non-axial loading forces of one of said structures is elastically received at said flexible diaphragm during rotation of said inner and outer rotating structures.

2. The invention of claim 1 and wherein said flexible diaphragm is attached to a rotating structure at the periphery thereof; and said member defining a plurality of corresponding spline receiving, axially extending slots is attached to a rotating power source.

3. The invention of claim 1 and wherein said means biasing said fingers relative to said axis with a force into said slot biases said fingers outwardly into said slots.

4. The invention of claim 1 and wherein said biasing means includes said fingers defining at their combined axially exposed inner surfaces a frustroconical concavity; a frustroconical mandrel complementary to said frustroconical concavity of said finger; and means for biasing said frustroconical mandrel towards the apex of said frustroconical concavity towards said fingers outwardly and away from said axis with a uniform force at said outer contacting surfaces to said finger-receiving slots.

* * * * *